United States Patent
Liu et al.

(10) Patent No.: US 11,727,216 B2
(45) Date of Patent: Aug. 15, 2023

(54) METHOD, APPARATUS, DEVICE, AND STORAGE MEDIUM FOR LINKING ENTITY

(71) Applicant: BEIJING BAIDU NETCOM SCIENCE AND TECHNOLOGY CO., LTD., Beijing (CN)

(72) Inventors: Zhijie Liu, Beijing (CN); Qi Wang, Beijing (CN); Zhifan Feng, Beijing (CN); Chunguang Chai, Beijing (CN); Yong Zhu, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 287 days.

(21) Appl. No.: 17/117,553

(22) Filed: Dec. 10, 2020

(65) Prior Publication Data
US 2021/0383069 A1    Dec. 9, 2021

(30) Foreign Application Priority Data
Jun. 9, 2020  (CN) .......................... 202010519600.4

(51) Int. Cl.
*G06F 17/00* (2019.01)
*G06F 40/30* (2020.01)
(Continued)

(52) U.S. Cl.
CPC .............. *G06F 40/30* (2020.01); *G06F 17/16* (2013.01); *G06F 40/295* (2020.01)

(58) Field of Classification Search
None
See application file for complete search history.

(56) References Cited

U.S. PATENT DOCUMENTS 10,380,259 B2 *  8/2019  Lee .......................... G06N 5/04
10,593,422 B2 *  3/2020  Manica ................ G06K 9/6223
(Continued)

FOREIGN PATENT DOCUMENTS

CN         104462126 A    3/2015
CN         106940702 A    7/2017
(Continued)

OTHER PUBLICATIONS

Jul. 27, 2022 Korean Notice of Allowance for Korean Application No. 10-2020-0172512 (4 pgs).
(Continued)

*Primary Examiner* — Satwant K Singh
(74) *Attorney, Agent, or Firm* — Knobbe, Martens, Olson & Bear, LLP

(57) ABSTRACT

A method, apparatus, device, and storage medium for linking an entity, relates to the technical fields of knowledge graph and deep learning are provided. The method may include: acquiring a target text; determining at least one entity mention included in the target text and a candidate entity corresponding to each entity mention; determining an embedding vector of each candidate entity based on the each candidate entity and a preset entity embedding vector determination model; determining context semantic information of the target text based on the target text and each embedding vector; determining type information of the at least one entity mention; and determining an entity linking result of the at least one entity mention, based on the each embedding vector, the context semantic information, and each type information.

19 Claims, 7 Drawing Sheets

(51) Int. Cl.
   *G06F 40/295* (2020.01)
   *G06F 17/16* (2006.01)

(56) References Cited

U.S. PATENT DOCUMENTS

| 11,238,339 B2* | 2/2022 | Powell .................... G06F 40/30 |
| 11,551,042 B1* | 1/2023 | Yu ........................ G06F 18/2431 |
| 2018/0232443 A1 | 8/2018 | Delgo et al. |
| 2019/0163836 A1 | 5/2019 | Shenoy |
| 2020/0065422 A1* | 2/2020 | Yan ........................ G06N 3/082 |

FOREIGN PATENT DOCUMENTS

| CN | 107861939 A | 3/2018 |
| CN | 108280061 A | 7/2018 |
| CN | 110110324 A | 8/2019 |
| CN | 110991187 A | 4/2020 |
| JP | 2019049964 | 3/2019 |
| KR | 20190094078 A | 8/2019 |
| WO | WO 2015125209 | 8/2015 |
| WO | WO 2019/089288 A1 | 5/2019 |
| WO | WO 2019224891 | 11/2019 |
| WO | WO 2020003928 | 1/2020 |

OTHER PUBLICATIONS

Kilias, et al., "IDEL: In-Database Neural Entity Linking", Beuth University of Applied Sciences. Luxemburger Strabe 10 13353 Berlin Germany.
European Search Report dated May 27, 2021 for European Patent Application No. 20211569.7. 9 pages.
Jun. 28, 2022 Japanese Office Action from related JP App. No. 2020-206160 (4 pgs).
Korean Office Action dated Feb. 10, 2022 for Korean Patent Application No. 10-2020-0172512.
Summary of the third lecture BERT of the 'Natural Language Language Model BERT' of the Tacademy lecture.

* cited by examiner

METHOD, APPARATUS, DEVICE, AND STORAGE MEDIUM FOR LINKING ENTITY

CROSS-REFERENCE TO RELATED APPLICATIONS

This application claims priority to Chinese Application No. 202010519600.4, filed on Jun. 9, 2020 and entitled "Method, Apparatus, Device and Storage Medium for Linking Entity," which is hereby incorporated by reference in its entirety.

TECHNICAL FIELD

Embodiments of the present disclosure relate to the field of computer technology, specifically to the technical fields of knowledge graph and deep learning, and more specifically to a method, apparatus, device, and storage medium for linking an entity.

BACKGROUND

In order to allow the machine to understand text better, the machine often needs to recognize entities in the text, and at the same time correspond the entities in the text to entities in a corresponding knowledge base in one-to-one correspondence. There are often many entities with the same name in the knowledge base, and entity linking is required. Entity linking can play a positive role in many natural language processing and information retrieval tasks.

The existing entity linking solutions cannot fully and effectively use external knowledge information, resulting in low accuracy of the entity linking.

SUMMARY

A method, apparatus, device, and storage medium for linking an entity are provided.

In a first aspect, an embodiment of the present disclosure provides a method for linking an entity, the method including: acquiring a target text; determining at least one entity mention included in the target text and a candidate entity corresponding to each entity mention; determining an embedding vector of each candidate entity, based on the each candidate entity and a preset entity embedding vector determination model; determining context semantic information of the target text, based on the target text and each embedding vector; determining type information of the at least one entity mention; and determining an entity linking result of the at least one entity mention, based on the each embedding vector, the context semantic information, and each type information.

In a second aspect, an embodiment of the present disclosure provides an apparatus for linking an entity, the apparatus including: a target text acquisition unit, configured to acquire a target text; a candidate entity determination unit, configured to determine at least one entity mention included in the target text and a candidate entity corresponding to each entity mention; an embedding vector determination unit, configured to determine an embedding vector of each candidate entity, based on the each candidate entity and a preset entity embedding vector determination model; a context determination unit, configured to determine context semantic information of the target text, based on the target text and each embedding vector; a type information determination unit, configured to determine type information of the at least one entity mention; and an entity linking unit, configured to determine an entity linking result of the at least one entity mention, based on the each embedding vector, the context semantic information, and each type information.

In a third aspect, an embodiment of the present disclosure provides an electronic device for linking an entity, the device electronic including: at least one processor; and a memory, communicatively connected with the at least one processor, the memory storing instructions executable by the at least one processor, the instructions, when executed by the at least one processor, causing the at least one processor to perform the method according to the first aspect.

In a fourth aspect, an embodiment of the present disclosure provides a non-transitory computer readable storage medium, storing computer instructions, the computer instructions being used to cause a computer to perform the method according to the first aspect.

According to the technical solution of embodiments of the present disclosure, external knowledge can be fully used, thereby improving the accuracy of the entity linking.

It should be appreciated that the description of the Summary is not intended to limit the key or important features of embodiments of the present disclosure, or to limit the scope of the present disclosure. Other features of the present disclosure will become readily comprehensible through the following description.

BRIEF DESCRIPTION OF THE DRAWINGS

The accompanying drawings are used to better understand the present solution and do not constitute a limitation to the present disclosure.

DETAILED DESCRIPTION OF EMBODIMENTS

Example embodiments of the present disclosure are described below in combination with the accompanying drawings, and various details of embodiments of the present disclosure are included in the description to facilitate understanding, and should be considered as illustrative only. Accordingly, it should be recognized by one of the ordinary skilled in the art that various changes and modifications may be made to embodiments described herein without departing from the scope and spirit of the present disclosure. Also, for clarity and conciseness, descriptions for well-known functions and structures are omitted in the following description.

It should also be noted that some embodiments in the present disclosure and some features in the disclosure may be combined with each other on a non-conflict basis. Features of the present disclosure will be described below in detail with reference to the accompanying drawings and in combination with embodiments.

Figure 1:
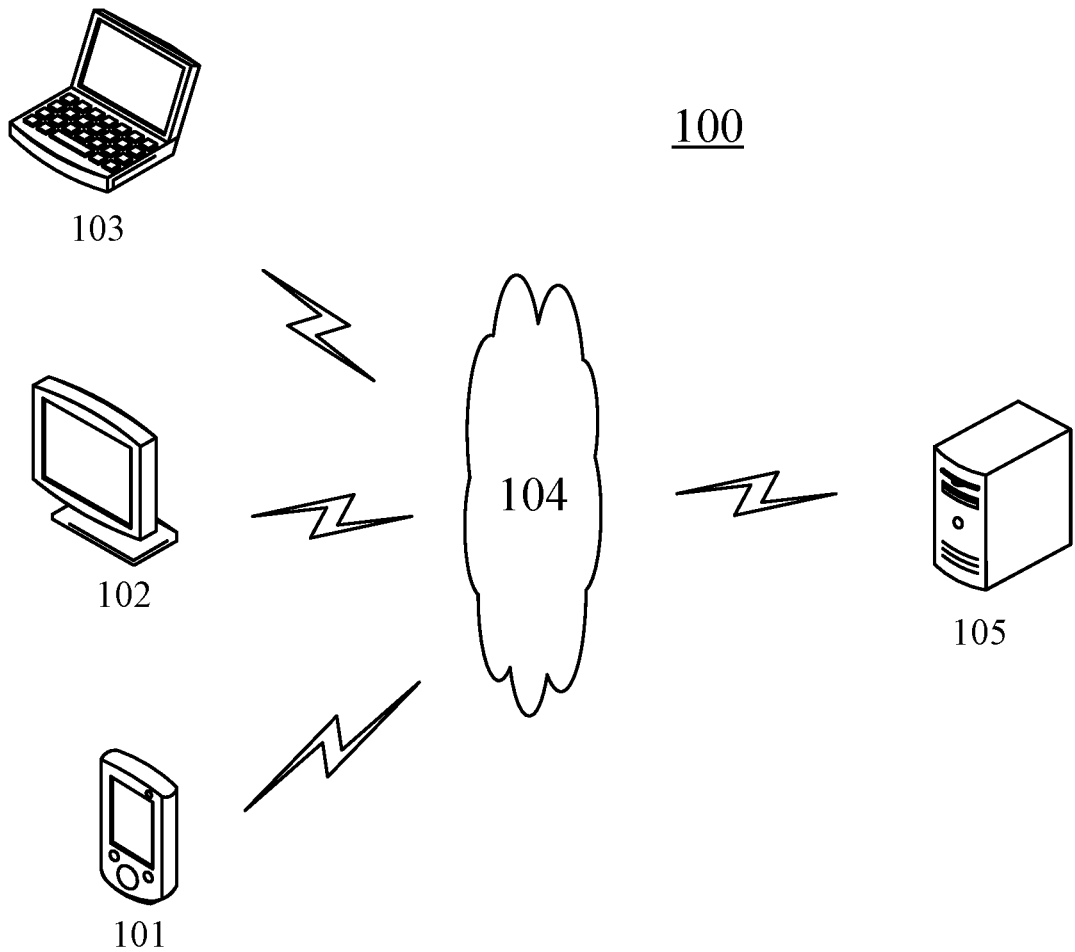
FIG. 1 is a diagram of an example system architecture in which an embodiment of the present disclosure may be implemented.

FIG. 1 illustrates an example system architecture 100 in which a method for linking an entity or an apparatus for linking an entity of embodiments of the present disclosure may be implemented.

As shown in FIG. 1, the system architecture 100 may include terminal devices 101, 102, 103, a network 104, and a server 105. The network 104 serves as a medium providing a communication link between the terminal devices 101, 102, 103 and the server 105. The network 104 may include various types of connections, such as wired or wireless communication links, or optic fibers.

A user may use the terminal devices 101, 102, 103 to interact with the server 105 through the network 104 to receive or send messages, etc. Various communication client applications, such as search applications, may be installed on the terminal devices 101, 102, 103.

The terminal devices 101, 102, 103 may be hardware or software. When the terminal devices 101, 102, 103 are hardware, the terminal devices 101, 102, 103 may be various electronic devices, including but not limited to smart phones, tablet computers, E-book readers, vehicle-mounted computers, laptop portable computers, desktop computers, and so on. When the terminal devices 101, 102, 103 are software, the terminal devices 101, 102, 103 may be installed in the electronic devices listed above. The terminal devices 101, 102, 103 may be implemented as a plurality of pieces of software or software modules (for example, for providing distributed services), or as a single piece of software or software module, which is not specifically limited herein.

The server 105 may be a server that provides various services, such as a backend server that processes information sent by the terminal devices 101, 102, 103. The backend server may recognize entities in a text sent by a terminal, and associate the entities with entities in a knowledge base. An executing body may also send an entity linking result to the terminal devices 101, 102, 103.

It should be noted that the server 105 may be hardware or software. When the server 105 is hardware, the server 105 may be implemented as a distributed server cluster composed of a plurality of servers, or as a single server. When the server 105 is software, the server 105 may be implemented as a plurality of pieces of software or software modules (for example, for providing distributed services) or as a single piece of software or software module, which is not specifically limited herein.

It should be noted that the method for linking an entity provided by embodiments of the present disclosure is generally performed by the server 105. Accordingly, the apparatus for linking an entity is generally provided in the server 105.

It should be understood that the numbers of terminal devices, networks and servers in FIG. 1 are merely illustrative. Depending on the implementation needs, there may be any number of terminal devices, networks and servers.

Figure 2:
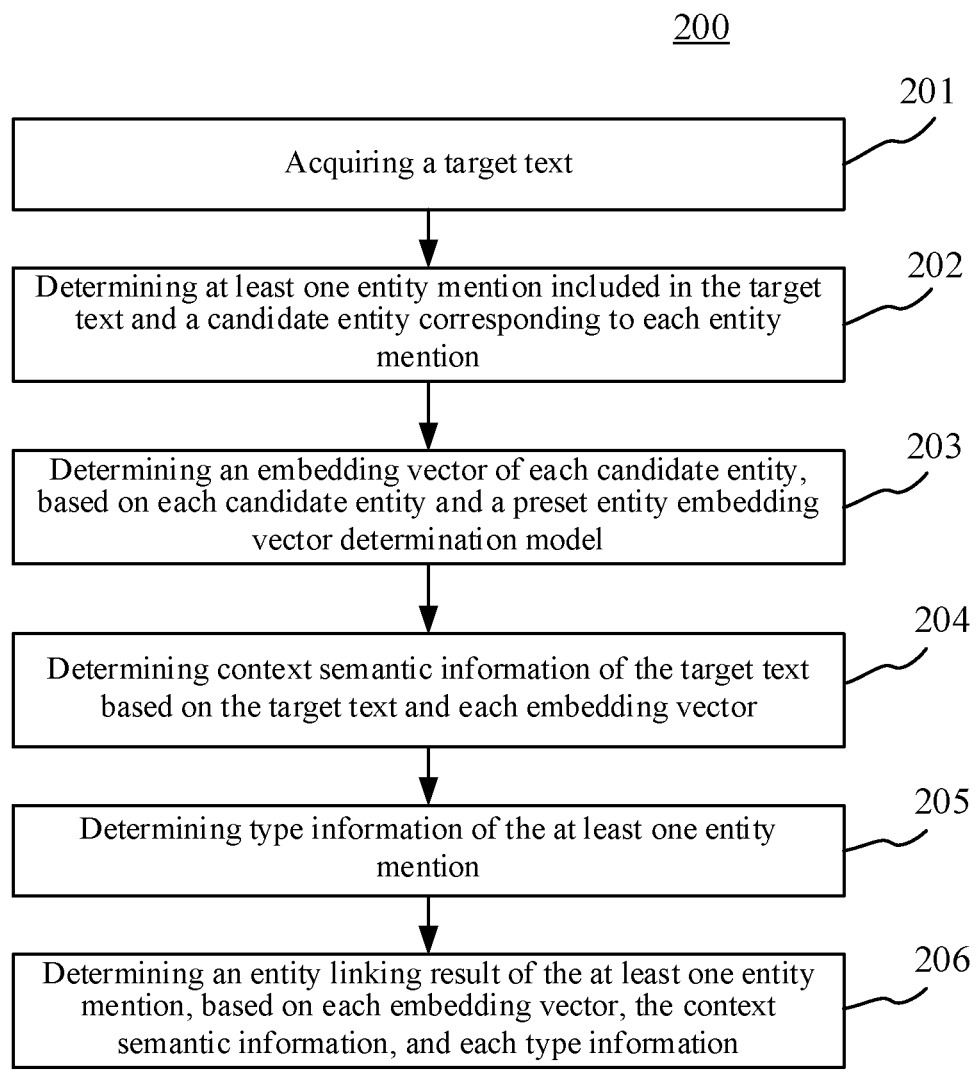
FIG. 2 is a flowchart of a method for linking an entity according to an embodiment of the present disclosure.

With further reference to FIG. 2, a flow 200 of a method for linking an entity according to an embodiment of the present disclosure is illustrated. Entity linking may generally include two parts of entity recognition and entity disambiguation. Entity recognition refers to recognizing entities in a text, and entity disambiguation refers to linking recognized entities with existing entities in a knowledge base. The semantics of the text may be accurately understood through entity linking. The method for linking an entity of the present embodiment includes the following steps.

Step 201, acquiring a target text.

In the present embodiment, an executing body of the method for linking an entity (for example, the server 105 shown in FIG. 1) may acquire the target text through a wired connection or a wireless connection. The target text may be a text inputted by a user using a terminal. The target text may be a retrieval sentence, which may include at least one entity mention. For example, the target text may be "Where is the best place to go this summer."

Step 202, determining at least one entity mention included in the target text and a candidate entity corresponding to each entity mention.

After acquiring the target text, the executing body may perform various processing on the target text to determine the at least one entity mention included in the target text. For example, the executing body may perform word segmentation processing on the target text, and use obtained nouns as the entity mentions. Alternatively, the executing body may perform named entity recognition on the target text, and use obtained named entities as the entity mentions. Here, entity mention refers to the textual representation of an entity, which may be a named entity, a common noun phrase, a pronoun, etc. For example, for the entity "Fudan University", the entity mentions of the entity may include "Fudan University", "Fudan", "Dan University" and so on.

The executing body may be connected to at least one preset knowledge base, and the knowledge base includes rich text semantic information. The knowledge base may include English knowledge bases such as TAP, Wikipedia, Freebase, YAGO, Chinese knowledge bases such as Baidu Baike, HDWiki, Chinese Wikipedia, etc. The executing body may find the candidate entity corresponding to each entity mention from the above knowledge base. Here, the candidate entity is an entity that exists in the knowledge base and is associated with the entity mention. The name of the candidate entity may be the same as the name of the entity mention, or may also be an alternative name of the entity mention. For example, for the entity mention "summer", the corresponding candidate entities may include the movie "Summer" (a German love movie released in 2008), the song "Summer" (song written by Li Ronghao, released in July 2010), and Summer (the second season of the four seasons, summer in English).

Step 203, determining an embedding vector of each candidate entity, based on each candidate entity and a preset entity embedding vector determination model.

In the present embodiment, the executing body may input each candidate entity into a pre-trained entity embedding vector determination model to obtain the embedding vector (embedding) of each candidate entity. The entity embedding vector determination model is used to represent a corresponding relationship between the candidate entity and the embedding vector. The entity embedding vector determination model may be a plurality of existing language models, for example, Bert (Bidirectional Encoder Representation from Transformers, two-way Transformer encoder), Ernie (Ernie is built based on Baidu's deep learning framework paddlepaddle), and so on. The embedding vector is a vector representation of the candidate entity, which includes semantic information of the entity mention.

Step 204, determining context semantic information of the target text based on the target text and each embedding vector.

The executing body may further determine the context semantic information of the target text, based on the target text and the embedding vector of each candidate entity. Specifically, the executing body may use an attention mechanism to learn the embedding vector of the candidate entity to select a context vocabulary most semantically relevant to the entity mention or a context entity most semantically relevant to the entity mention in the target text. The context semantic information here may include these context vocabularies or context entities, and may also include vectors of these context vocabularies or context entities. For example, the executing body may use an existing coding algorithm to encode a context vocabulary to obtain a vector of the context vocabulary.

Step 205, determining type information of the at least one entity mention.

In the present embodiment, the executing body may further determine the type information of each entity mention. Specifically, the executing body may determine the type information of the entity mention based on the context vocabulary of each entity mention. The above type information is used to indicate the type of the entity mention. For example, the target text is: "Zhang San was born in Beijing". Here, the type of the entity mention "Beijing" may be determined based on its above context vocabulary "born in", and the type is "location".

Step 206, determining an entity linking result of the at least one entity mention, based on each embedding vector, the context semantic information, and each type information.

The executing body may determine the entity linking result of each entity mention based on various information obtained. Specifically, the executing body may input the various information into a preset model, determine the vector of each entity mention, and then calculate a similarity between the above vector and a vector of the candidate entity of the entity mention. The candidate entity having the highest similarity is used as the entity linking result of the entity mention.

Figure 3:
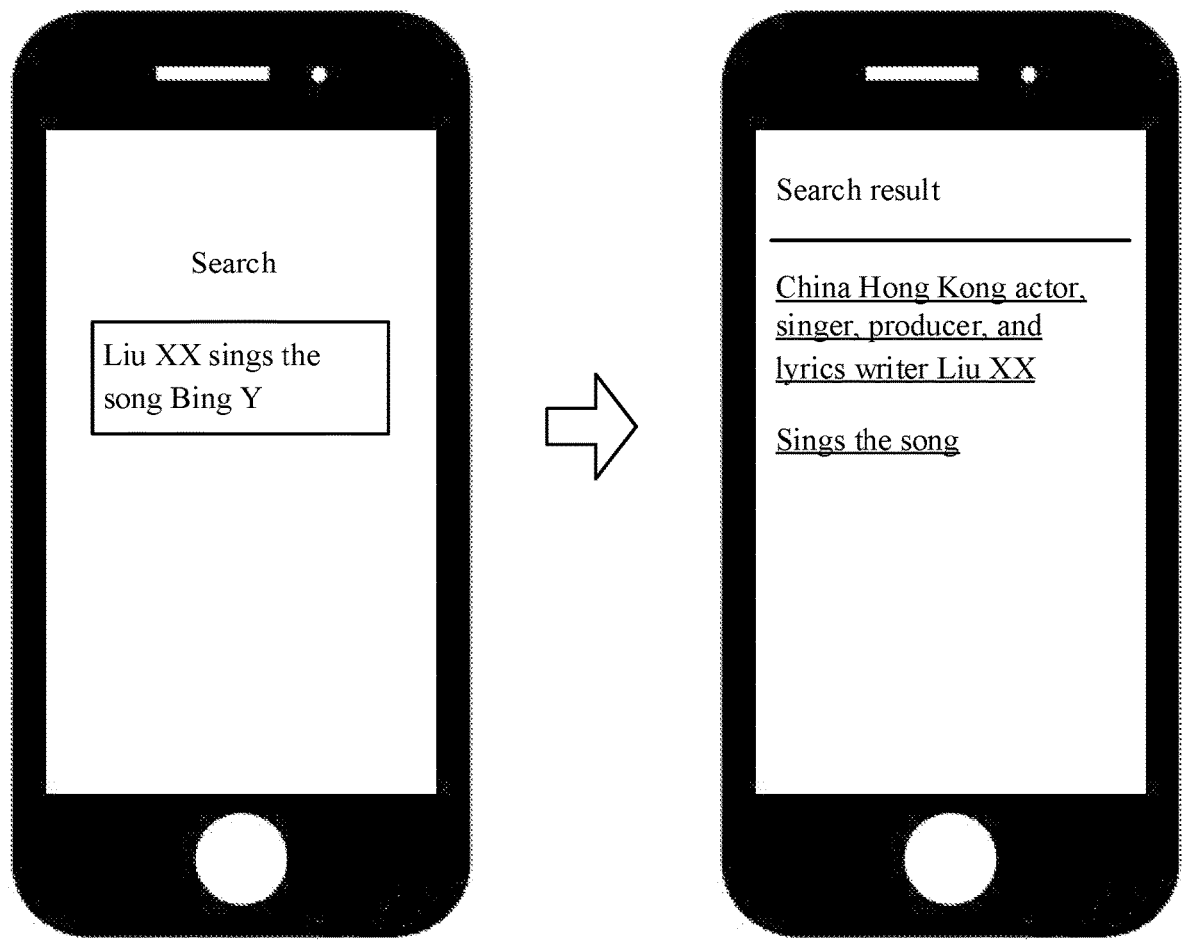
FIG. 3 is a schematic diagram of an application scenario of the method for linking an entity according to an embodiment of the present disclosure.

FIG. 3 is a schematic diagram of an application scenario of the method for linking an entity according to an embodiment of the present disclosure. In the application scenario of FIG. 3, a user inputs the sentence "Liu XX sings the song Bing Y" using a search application in a terminal 301. After a server 302 receives the input sentence, the server 302 obtains the entity mentions as "Liu XX" and "Bing Y". After the processing of steps 202 to 206, the server 302 disambiguates these entities and determines that "China Hong Kong actor, singer, producer, and lyrics writer Liu XX" is the correct entity.

The method for linking an entity provided by embodiments of the present disclosure may make full use of the embedding vector of the entity mention, the context information of the target text and the type information of the entity mention in the entity linking process, thereby improving the accuracy of the entity linking.

Figure 4:
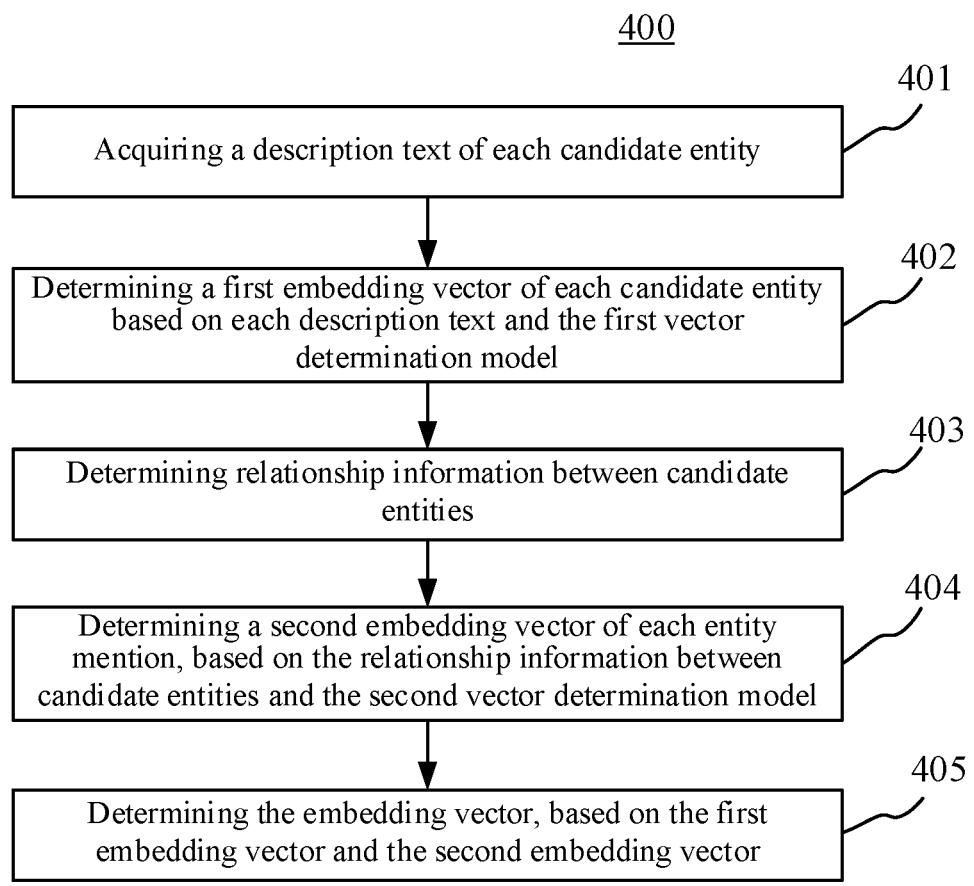
FIG. 4 is a flowchart of determining an embedding vector of a candidate entity in the method for linking an entity according to an embodiment of the present disclosure.

With further reference to FIG. 4, a flow 400 of determining an embedding vector of a candidate entity in the method for linking an entity according to an embodiment of the present disclosure is illustrated. In the present embodiment, the entity embedding vector determination model includes a first vector determination model and a second vector determination model, the first vector determination model is used to represent a corresponding relationship between a description text of an entity and an embedding vector, and the second vector determination model is used to represent a corresponding relationship between relationship information between entities and an embedding vector. Here, the description text may be text related to description of the entity, for example, the description text may include a description of the meaning of the entity in the knowledge base, an abstract, and so on. The description text of the entity may include a semantically related word of the entity. For example, for the text "Li Bai is a poet in the Tang Dynasty", "Poet in the Tang Dynasty" is a semantically related word of the entity "Li Bai". The relationship information between entities is used to represent the relationship between the entities in the knowledge base. For example, for the text "Li Bai and Du Fu are good friends", then the relationship between the entity "Li Bai" and the entity "Du Fu" is "good friends."

A first embedding vector may be obtained using the first vector determination model. The first vector model may learn the relationship between the entity and the semantically related word in the description text of the entity, and make a distance between the obtained first embedding vector of the entity and a vector of the semantically related word closer. In this way, the first embedding vector contains semantic information of the entity, which may be used to improve the accuracy of the entity linking. The relationship between the entities may be learned using the second vector determination model. A second embedding vector obtained using the second vector determination model contains the relationship information between entities.

The first vector determination model and the second vector determination model may be obtained through training of corresponding deep learning task data. The first vector determination model and the second vector determination model may include a plurality of existing models, for example, language models (LM), long short-term memory networks (LSTM), and so on.

As shown in FIG. 4, the method for linking an entity of the present embodiment may determine the embedding vector of the candidate entity through the following steps.

Step 401, acquiring a description text of each candidate entity.

The executing body may determine the description text of each candidate entity after obtaining each candidate entity corresponding to each entity mention. Specifically, the executing body may acquire the description text of the candidate entity from the knowledge base or other electronic devices.

Step 402, determining a first embedding vector of each candidate entity based on each description text and the first vector determination model.

The executing body may input the description text of each candidate entity into the first vector determination model to determine the first embedding vector of each candidate entity. The first vector determination model may perform word segmentation on the description text of the candidate entity to obtain a plurality of words. Then, stop words in the plurality of words are filtered. The stop words may include "have", "'s" and so on. The remaining words are used as the semantically related words of the candidate entity. For example, the description text is "Li Bai is the simplest assassin among assassins", and the entity is "Li Bai". After word segmentation and filtering, "assassin", "simple" and "assassin" are determined as the semantically related words of the entity "Li Bai". The candidate entities corresponding to the entity "Li Bai" include: candidate entity 1 (Entity1) "Li Bai", whose description text is "Li Bai, a poet of the Tang Dynasty, another name Taibai . . . " and candidate entity 2 (Entity2) "Li Bai", whose description text is "Li Bai: Assassin-type hero character in the game King of Glory". The semantically related words of Entity1 include "Tang Dynasty", "Poet", "Another name" and "Taibai". The semantically related words of Entity2 include "King of Glory", "Assassin", "Hero" and "Character". The first embedding vector of the candidate entity "Li Bai" obtained through the first vector determination model is closer to the vector of "King of Glory", "Assassin", "Hero" and "Character".

Step 403, determining relationship information between candidate entities.

The executing body may further determine the relationship information between candidate entities through semantic analysis of the description text. For example, the description text is "Is it difficult to use Han Xin in a headwind around in 'King of Glory'", and the entities included are "King of Glory" and "Han Xin". By analyzing the above description text, the relationship information between "King of Glory" and "Han Xin" may be determined as "main character", and the relationship information between "Han Xin" and "King of Glory" may be determined as "the game in".

Step 404, determining a second embedding vector of each entity mention, based on the relationship information between candidate entities and the second vector determination model.

After obtaining the relationship information between candidate entities, the executing body may input the relationship information between candidate entities into the second vector determination model to obtain a second embedding vector of each candidate entity. The second vector determination model may learn this kind of relationship information, so that the obtained second embedding vector contains this kind of relationship information, thereby improving the effect of the entity linking.

Step 405, determining the embedding vector, based on the first embedding vector and the second embedding vector.

After obtaining the first embedding vector and the second embedding vector, the executing body may perform fusion or concatenating or other processing on the first embedding vector and the second embedding vector to obtain the embedding vector.

The method for linking an entity provided by embodiments of the present disclosure may fully learn the relationship information between the candidate entities in the description text, and also learn the semantically related words of the candidate entities, so as to make full use of external knowledge and improve the accuracy of the entity linking.

Figure 5:
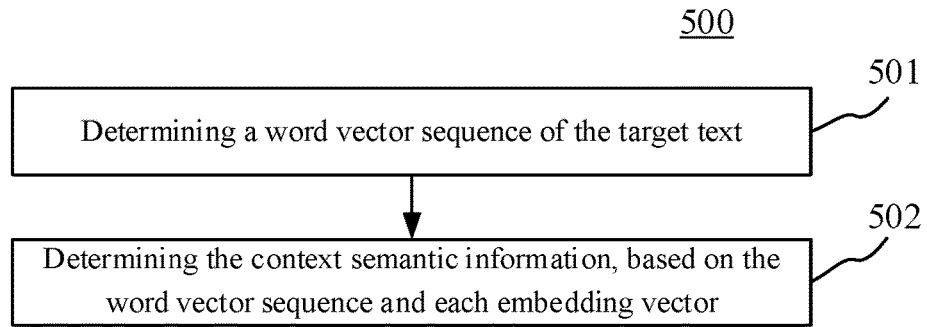
FIG. 5 is a flowchart of determining context semantic information in the method for linking an entity according to an embodiment of the present disclosure.

With further reference to FIG. 5, a flow 500 of determining context semantic information in the method for linking an entity according to an embodiment of the present disclosure is illustrated. As shown in FIG. 5, the method for linking an entity of the present embodiment may determine the context semantic information through the following steps.

Step 501, determining a word vector sequence of the target text.

The executing body may input the target text into a word vector determination model to determine the word vector sequence. Alternatively, the executing body may first perform word segmentation on the target text, then input each segmented word into the word vector determination model to obtain a vector of each word. By combining the vectors of the words, the word vector sequence is obtained. The word vector determination model may be char2vec.

Step 502, determining the context semantic information, based on the word vector sequence and each embedding vector.

The executing body may use the Attention mechanism to learn the word vector sequence and the embedding vector of each candidate entity to determine the context information. The context information here may be a vector used to represent the target text, or a vocabulary representing the target text, and so on. The Attention mechanism is a problem-solving method proposed by imitating human attention. Simply put, the Attention mechanism is to quickly filter high-value information from a large amount of information.

Figure 6:
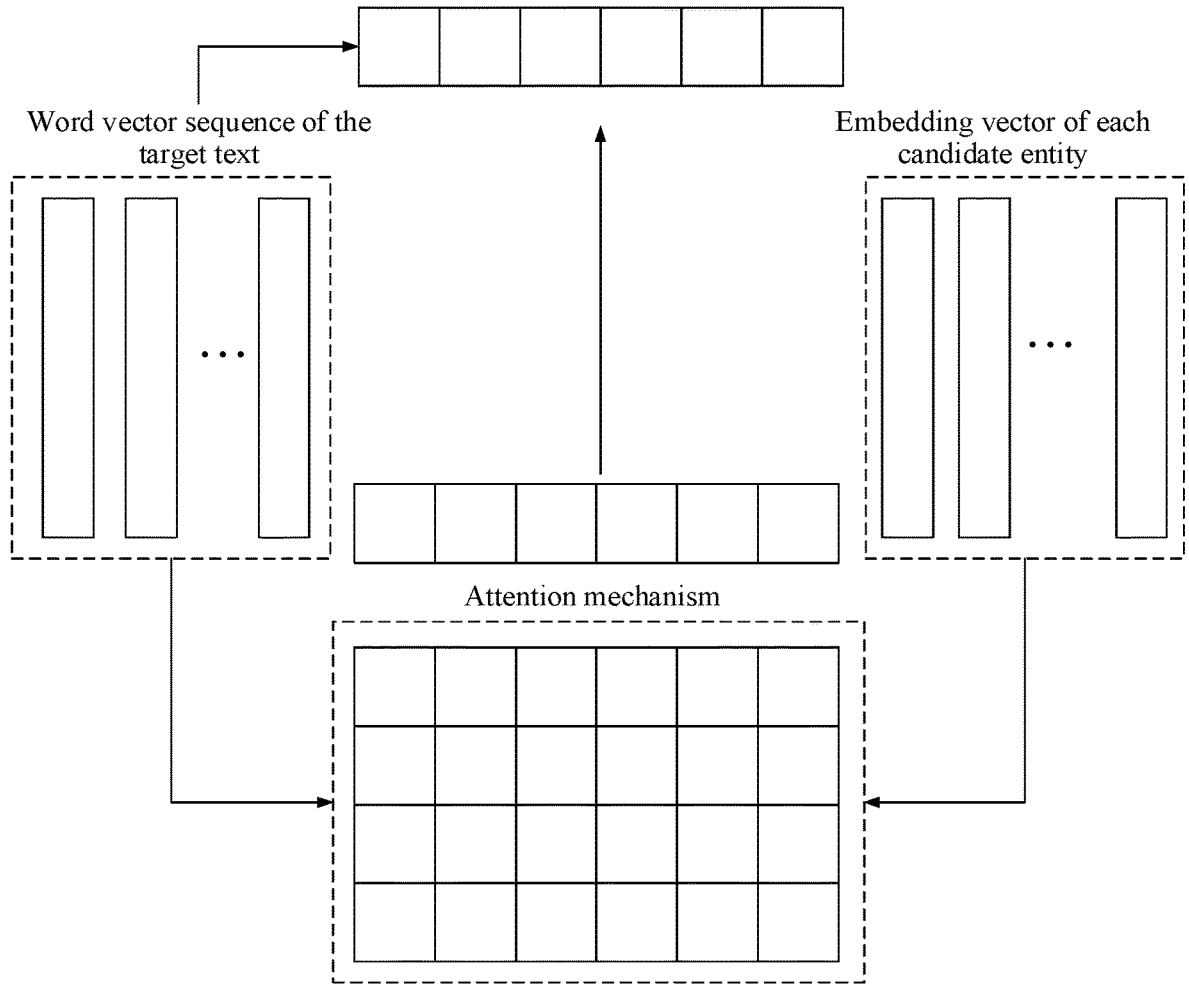
FIG. 6 is a schematic diagram of using an Attention mechanism to learn a word vector sequence and an embedding vector of each candidate entity in the embodiment shown in FIG. 5.

FIG. 6 shows a schematic diagram of using the Attention mechanism to learn the word vector sequence and the embedding vector of each candidate entity in the present embodiment. In FIG. 6, the left side is the word vector sequence of the target text, where each column represents a word vector. The right side is the embedding vector of each candidate entity. The Attention mechanism uses parameter matrix A to learn the word vector sequence and the embedding vector of each candidate entity to obtain a vector. The vector contains correlation information between the whole target text and the candidate entity, and each value in the vector represents a weight. The vector and the word vector sequence of the target text are weighted and averaged to obtain the final context semantic information.

In some alternative implementations of the present embodiment, step 501 may be implemented through the following steps not shown in FIG. 5: determining an embedding vector of the entity corresponding to the entity linking result, in response to acquiring the entity linking result of the at least one entity mention; and updating the word vector sequence using the determined embedding vector.

In this implementation, the executing body may acquire the entity linking result of each entity mention. The target text may contain a plurality of entity mentions. If there is an entity mention linked to a candidate entity, the executing body may use the embedding vector of the candidate entity as a word vector of the entity mention. In this way, information of the entity mention contained in the obtained word vector is richer.

The method for linking an entity provided by embodiments of the present disclosure may use the Attention mechanism to obtain the context information of the target text, improve the utilization rate of external knowledge, which is conducive to the improvement of the accuracy of the entity linking result.

Figure 7:
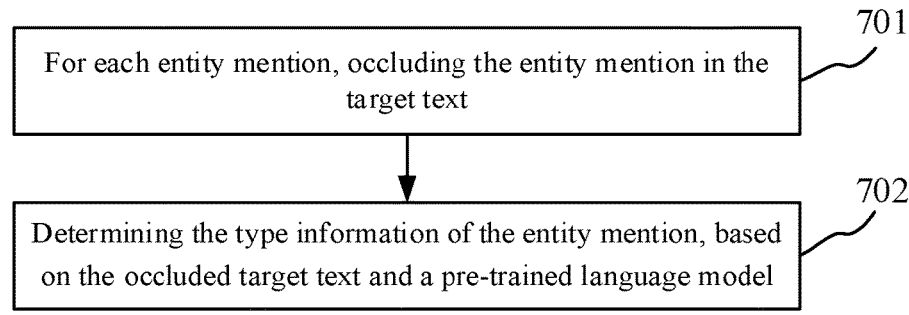
FIG. 7 is a flowchart of determining type information of an entity mention in the method for linking an entity according to an embodiment of the present disclosure.

With further reference to FIG. 7, a flow 700 of determining type information of an entity mention in the method for linking an entity according to an embodiment of the present disclosure is illustrated. As shown in FIG. 7, in the present embodiment, the type information of the entity mention may be determined through the following steps.

Step 701, for each entity mention, occluding the entity mention in the target text.

In the present embodiment, for each entity mention, the executing body may use a mask to occlude the entity mention. The above mask may be [mask]. For example, the target text is "Zhang San was born in Beijing". The target text includes the entity mentions "Zhang San" and "Beijing". The executing body may occlude "Zhang San" to obtain the occluded target text "[mask] was born in Beijing". "Beijing" may also be occluded to obtain the occluded target text "Zhang San was born in [mask]".

Step 702, determining the type information of the entity mention, based on the occluded target text and a pre-trained language model.

The executing body may input the occluded target text into the pre-trained language model to obtain the type information of the entity mention. The pre-trained language model may be Bert (Bidirectional Encoder Representation from Transformers, bidirectional Transformer encoder), Ernie (Ernie is built based on Baidu's deep learning framework paddlepaddle), and so on. The executing body may use the occluded target text to fine-tune the pre-trained language model. In this way, the pre-trained language model may reinforcement-learn the context information of the target text, that is, learn the relationship between the nearest neighboring vocabulary of the occluded entity mention and the occluded entity mention. Output of the above language model is a vector representing the type information, and the executing body may analyze the vector to determine the type information of the entity mention.

The method for linking an entity provided by embodiments of the present disclosure may capture the type information of the entity mention, so that the problem of the wrong type of entity linking may be solved.

Figure 8:
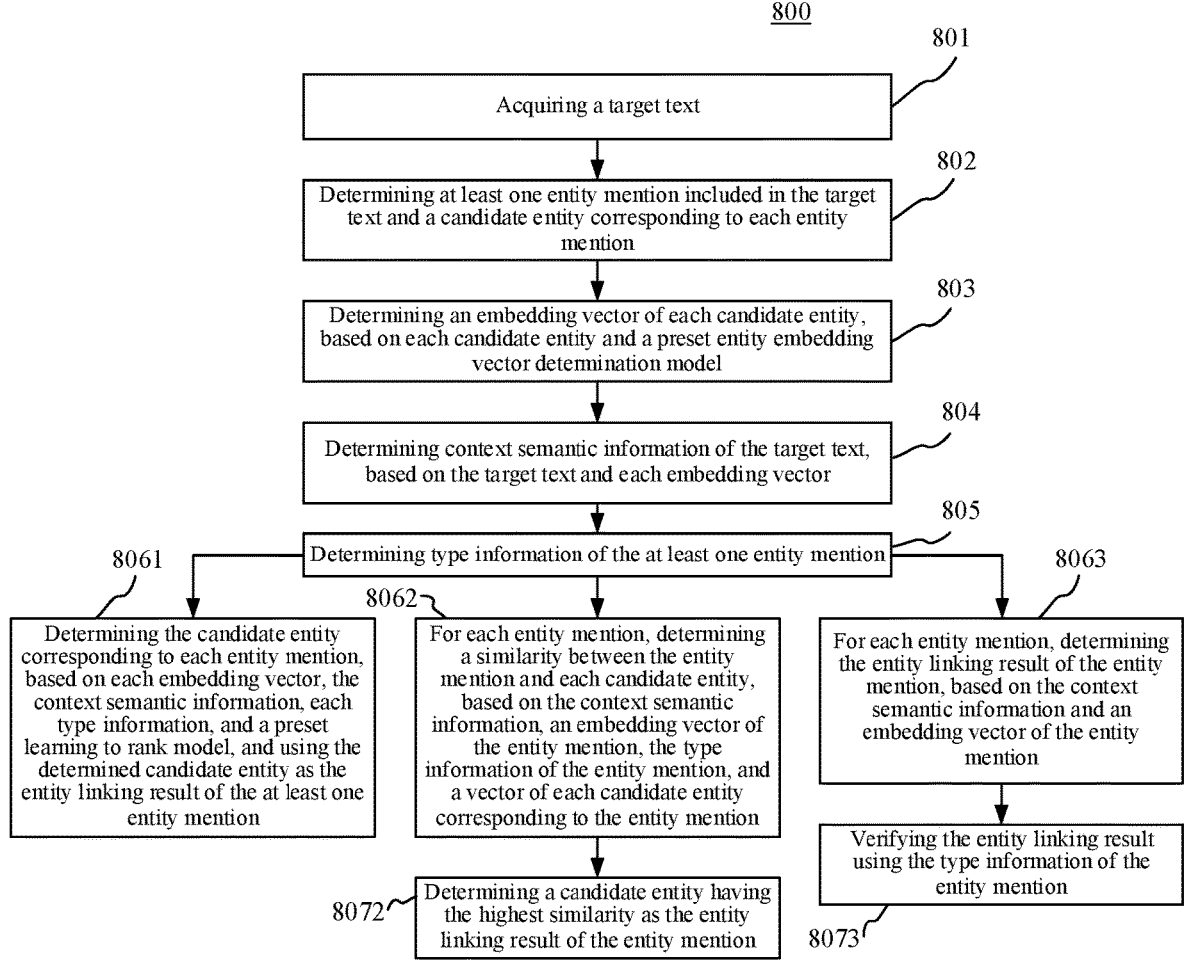
FIG. 8 is a flowchart of the method for linking an entity according to another embodiment of the present disclosure.

With further reference to FIG. 8, a flow 800 of the method for linking an entity according to another embodiment of the present disclosure is illustrated. As shown in FIG. 8, the method for linking an entity of the present embodiment may include the following steps.

Step 801, acquiring a target text.

Step 802, determining at least one entity mention included in the target text and a candidate entity corresponding to each entity mention.

Step 803, determining an embedding vector of each candidate entity, based on each candidate entity and a preset entity embedding vector determination model.

Step 804, determining context semantic information of the target text, based on the target text and each embedding vector.

Step 805, determining type information of the at least one entity mention.

After obtaining the embedding vector of each entity mention, the context semantic information of the target text and the type information of each entity mention, the executing body may obtain the entity linking result through step 8061, or obtain the entity linking result through steps 8062 and 8072, or obtain the entity linking result through steps 8063 and 8073.

Step 8061, determining the candidate entity corresponding to each entity mention, based on each embedding vector, the context semantic information, each type information, and a preset learning to rank model, and using the determined candidate entity as the entity linking result of the at least one entity mention.

In the present embodiment, the executing body may input the embedding vector of each entity mention, the context semantic information of the target text and the type information of each entity mention into the learning to rank (LTR) model to obtain the ranking of each candidate entity corresponding to each entity mention. The executing body may use the candidate entity in the first place in the corresponding ranking of each entity mention as the entity linking result of the entity mention.

The LTR model may include Pairwise algorithm, Listwise algorithm, and Pointwise algorithm. Here, the Pairwise algorithm needs to input the target text and two candidate entities (including a positive example and a negative example). After combining the three representations, the two candidate entities are scored through a perceptron network respectively, and a ranking loss function is used. The Listwise algorithm needs to input the target text and all candidate entities, then the target text representation and all the candidate entity representations are combined, each candidate entity is scored, and the ranking loss function is used. The Pointwise algorithm transforms the ranking problem into a classification problem. The Pointwise algorithm needs to input the target text and a candidate entity, use the confidence of a binary classification prediction result as a score of the candidate entity, and use a classification loss function.

Step 8062, for each entity mention, determining a similarity between the entity mention and each candidate entity, based on the context semantic information, an embedding vector of the entity mention, the type information of the entity mention, and a vector of each candidate entity corresponding to the entity mention.

Step 8072, determining a candidate entity having the highest similarity as the entity linking result of the entity mention.

In the present embodiment, for each entity mention, the executing body may further concatenate the context semantic information, the embedding vector of the entity mention, and the type information of the entity mention to obtain a vector representation of the entity mention, then calculate a distance between the vector representation and a vector of each candidate entity. Here, the distance is used to indicate the similarity between the entity mention and each candidate entity. Then, the candidate entity having the highest similarity is used as the entity linking result of the entity mention.

Step 8063, for each entity mention, determining the entity linking result of the entity mention, based on the context semantic information and an embedding vector of the entity mention.

Step 8073, verifying the entity linking result using the type information of the entity mention.

In the present embodiment, for each entity mention, the executing body may determine the entity linking result of the entity mention, based on the context semantic information and the embedding vector of the entity mention. Then, verifying the entity linking result using the type information of the entity mention may further improve the accuracy of the entity linking.

The method for linking an entity provided by embodiments of the present disclosure, may make full use of the embedding vector of the entity mention, the context information of the target text, and the type information of the entity mention, thereby improving the accuracy of the entity linking.

Figure 9:
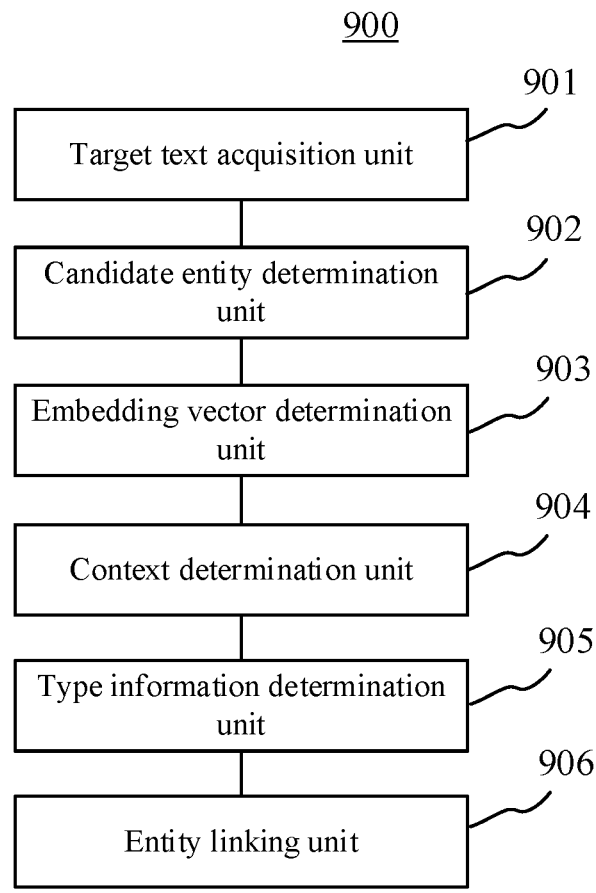
FIG. 9 is a schematic structural diagram of an apparatus for linking an entity according to an embodiment of the present disclosure.

With further reference to FIG. 9, as an implementation of the method shown in the above figures, an embodiment of the present disclosure provides an apparatus for linking an entity, and the apparatus embodiment corresponds to the method embodiment as shown in FIG. 2. The apparatus may be specifically applied to various electronic devices.

As shown in FIG. 9, an apparatus 900 for linking an entity of the present embodiment includes: a target text acquisition unit 901, a candidate entity determination unit 902, an embedding vector determination unit 903, a context determination unit 904, a type information determination unit 905 and an entity linking unit 906.

The target text acquisition unit 901 is configured to acquire a target text.

The candidate entity determination unit 902 is configured to determine at least one entity mention included in the target text and a candidate entity corresponding to each entity mention.

The embedding vector determination unit 903 is configured to determine an embedding vector of each candidate entity, based on the each candidate entity and a preset entity embedding vector determination model.

The context determination unit 904 is configured to determine context semantic information of the target text, based on the target text and each embedding vector.

The type information determination unit 905 is configured to determine type information of the at least one entity mention.

The entity linking unit 906 is configured to determine an entity linking result of the at least one entity mention, based on the each embedding vector, the context semantic information, and each type information.

In some alternative implementations of the present embodiment, the entity embedding vector determination model includes a first vector determination model and a second vector determination model, the first vector determination model represents a corresponding relationship between a description text and an embedding vector, and the second vector determination model represents a corresponding relationship between relationship information and an embedding vector.

In some alternative implementations of the present embodiment, the embedding vector determination unit 903 may further include a first vector determination module, a second vector determination module, and an embedding vector determination module not shown in FIG. 9.

The first vector determination module is configured to acquire a description text of the each candidate entity; determine a first embedding vector of the each candidate entity based on each description text and the first vector determination model.

The second vector determination module is configured to determine relationship information between candidate entities; determine a second embedding vector of the each entity mention, based on the relationship information between candidate entities and the second vector determination model.

The embedding vector determination module is configured to determine the embedding vector, based on the first embedding vector and the second embedding vector.

In some alternative implementations of the present embodiment, the context determination unit 904 may further include: a word vector sequence determination module and a context determination module not shown in FIG. 9.

The word vector sequence determination module is configured to determine a word vector sequence of the target text.

The context determination module is configured to determine the context semantic information, based on the word vector sequence and the each embedding vector.

In some alternative implementations of the present embodiment, the word vector sequence determination module is further configured to: determine an embedding vector of a candidate entity corresponding to the entity linking result, in response to acquiring the entity linking result of the at least one entity mention; and update the word vector sequence using the determined embedding vector.

In some alternative implementations of the present embodiment, the type information determination unit 905 may be further configured to: for each entity mention, occlude the entity mention in the target text; and determine the type information of the entity mention, based on the occluded target text and a pre-trained language model.

In some alternative implementations of the present embodiment, the entity linking unit 906 may be further configured to: determine the candidate entity corresponding to the each entity mention, based on the each embedding vector, the context semantic information, the each type information, and a preset learning to rank model, and use the determined candidate entity as the entity linking result of the at least one entity mention.

In some alternative implementations of the present embodiment, the entity linking unit 906 may be further configured to: for each entity mention, determine a similarity between the entity mention and the each candidate entity, based on the context semantic information, an embedding vector of the entity mention, the type information of the entity mention, and a vector of the each candidate entity corresponding to the entity mention; and determine a candidate entity having the highest similarity as the entity linking result of the entity mention.

In some alternative implementations of the present embodiment, the entity linking unit 906 may be further configured to: for each entity mention, determine the entity linking result of the entity mention, based on the context semantic information and the embedding vector of the entity mention; and verify the entity linking result using the type information of the entity mention.

It should be understood that the units 901 to 905 recorded in the apparatus 900 for linking an entity correspond to the steps in the method described with reference to FIG. 2 respectively. Therefore, the operations and features described above for method for linking an entity are also applicable to the apparatus 900 and the units contained therein, and detailed description thereof will be omitted.

According to an embodiment of the present disclosure, the present disclosure further provides an electronic device and a readable storage medium.

Figure 10:
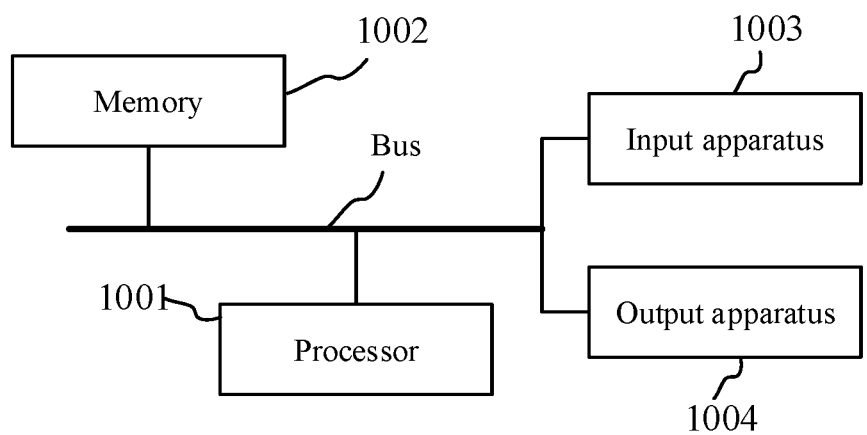
FIG. 10 is a block diagram of an electronic device for implementing the method for linking an entity according to embodiments of the present disclosure.

As shown in FIG. 10, a block diagram of an electronic device of the method for linking an entity according to an embodiment of the present disclosure is illustrated. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processors, cellular phones, smart phones, wearable devices, and other similar computing apparatuses. The components shown herein, their connections and relationships, and their functions are merely examples, and are not intended to limit the implementation of the present disclosure described and/or claimed herein.

As shown in FIG. 10, the electronic device includes: one or more processors 1001, a memory 1002, and interfaces for connecting various components, including high-speed interfaces and low-speed interfaces. The various components are connected to each other using different buses, and may be installed on a common motherboard or in other methods as needed. The processor may process instructions executed within the electronic device, including instructions stored in or on the memory to display graphic information of GUI on an external input/output apparatus (such as a display device coupled to the interface). In other embodiments, a plurality of processors and/or a plurality of buses may be used together with a plurality of memories if desired. Similarly, a plurality of electronic devices may be connected, and the devices provide some necessary operations, for example, as a server array, a set of blade servers, or a multi-processor system. In FIG. 10, one processor 1001 is used as an example.

The memory 1002 is a non-transitory computer readable storage medium provided by embodiments of the present disclosure. The memory stores instructions executable by at least one processor, so that the at least one processor performs the method for linking an entity provided by embodiments of the present disclosure. The non-transitory computer readable storage medium of some embodiments of the present disclosure stores computer instructions for causing a computer to perform the method for linking an entity provided by embodiments of the present disclosure.

The memory 1002, as a non-transitory computer readable storage medium, may be used to store non-transitory software programs, non-transitory computer executable programs and modules, such as program instructions/modules corresponding to the method for linking an entity in embodiments of the present disclosure (for example, the target text acquisition unit 901, the candidate entity determination unit 902, the embedding vector determination unit 903, the context determination unit 904, the type information determination unit 905 and the entity linking unit 906 as shown in FIG. 9). The processor 1001 executes the non-transitory software programs, instructions, and modules stored in the memory 1002 to execute various functional applications and data processing of the server, that is, to implement the method for linking an entity in the foregoing method embodiments.

The memory 1002 may include a storage program area and a storage data area, where the storage program area may store an operating system and at least one function required application program; and the storage data area may store data created by the use of the electronic device for linking an entity. In addition, the memory 1002 may include a high-speed random access memory, and may also include a non-transitory memory, such as at least one magnetic disk storage device, a flash memory device, or other non-transitory solid-state storage devices. In some embodiments, the memory 1002 may optionally include memories remotely provided with respect to the processor 1001, and these remote memories may be connected to the electronic device for linking an entity through a network. Examples of the above network include but are not limited to the Internet, intranet, local area network, mobile communication network, and combinations thereof.

The electronic device performing the method for linking an entity may further include: an input apparatus 1003 and an output apparatus 1004. The processor 1001, the memory 1002, the input apparatus 1003, and the output apparatus 1004 may be connected through a bus or in other methods. In FIG. 10, connection through the bus is used as an example.

The input apparatus 1003 may receive input digital or character information, and generate key signal inputs related to user settings and function control of the electronic device for linking an entity, such as touch screen, keypad, mouse, trackpad, touchpad, pointing stick, one or more mouse buttons, trackball, joystick and other input apparatuses. The output apparatus 1004 may include a display device, an auxiliary lighting apparatus (for example, LED), a tactile feedback apparatus (for example, a vibration motor), and the like. The display device may include, but is not limited to, a liquid crystal display (LCD), a light emitting diode (LED) display, and a plasma display. In some embodiments, the display device may be a touch screen.

Various implementations of the systems and techniques described herein may be implemented in a digital electronic circuit system, an integrated circuit system, an application specific integrated circuit (ASIC), computer hardware, firmware, software, and/or combinations thereof. These various implementations may include the implementation in one or more computer programs. The one or more computer programs may be executed and/or interpreted on a programmable system including at least one programmable processor, and the programmable processor may be a dedicated or general-purpose programmable processor, may receive data and instructions from a storage system, at least one input apparatus and at least one output apparatus, and transmit the data and the instructions to the storage system, the at least one input apparatus and the at least one output apparatus.

These computing programs, also referred to as programs, software, software applications or codes, include a machine instruction of the programmable processor, and may be implemented using a high-level procedural and/or an object-oriented programming language, and/or an assembly/machine language. As used herein, the terms "machine readable medium" and "computer readable medium" refer to any computer program product, device and/or apparatus (e.g., a magnetic disk, an optical disk, a storage device and a programmable logic device (PLD)) used to provide a machine instruction and/or data to the programmable processor, and include a machine readable medium that receives the machine instruction as a machine readable signal. The term "machine readable signal" refers to any signal used to provide the machine instruction and/or data to the programmable processor.

To provide an interaction with a user, the systems and techniques described here may be implemented on a computer having a display apparatus (e.g., a cathode ray tube (CRT)) or an LCD monitor) for displaying information to the user, and a keyboard and a pointing apparatus (e.g., a mouse or a track ball) by which the user may provide the input to the computer. Other kinds of apparatuses may also be used to provide the interaction with the user. For example, a feedback provided to the user may be any form of sensory feedback (e.g., a visual feedback, an auditory feedback, or a tactile feedback); and an input from the user may be received in any form, including acoustic, speech, or tactile input.

The systems and techniques described here may be implemented in a computing system (e.g., as a data server) that includes a backend part, implemented in a computing system (e.g., an application server) that includes a middleware part, implemented in a computing system (e.g., a user computer having a graphical user interface or a Web browser through which the user may interact with an implementation of the systems and techniques described here) that includes a frontend part, or implemented in a computing system that includes any combination of the backend part, the middleware part or the frontend part. The parts of the system may be interconnected by any form or medium of digital data communication (e.g., a communication network). Examples of the communication network include a local area network (LAN), a wide area network (WAN) and the block chain network.

The computer system may include a client and a server. The client and the server are generally remote from each other and typically interact through the communication network. The relationship between the client and the server is generated through computer programs running on the respective computer and having a client-server relationship to each other.

According to the technical solution of embodiments of the present disclosure, external knowledge can be fully used, thereby improving the accuracy of the entity linking.

It should be understood that the various forms of processes shown above may be used to resort, add or delete steps. For example, the steps described some embodiments of in the present disclosure may be performed in parallel, sequentially, or in a different order. As long as the desired result of the technical solution disclosed in some embodiments of the present disclosure can be achieved, no limitation is made herein.

Embodiments do not constitute a limitation to the scope of protection of the present disclosure. It should be appreciated by those skilled in the art that various modifications, combinations, sub-combinations and substitutions may be made depending on design requirements and other factors. Any modifications, equivalents and replacements, and improvements falling within the spirit and the principle of the present disclosure should be included within the scope of protection of the present disclosure.

What is claimed is:

1. A method for linking an entity, the method comprising:
   acquiring a target text;
   determining at least one entity mention comprised in the target text and a candidate entity corresponding to each entity mention;
   determining an embedding vector of each candidate entity, based on the each candidate entity and a preset entity embedding vector determination model;
   determining context semantic information of the target text, based on the target text and each embedding vector;
   determining type information of the at least one entity mention based on a context vocabulary of each entity mention; and
   determining an entity linking result of the at least one entity mention, based on the each embedding vector, the context semantic information, and each type information.

2. The method according to claim 1, wherein the entity embedding vector determination model comprises a first vector determination model and a second vector determination model, the first vector determination model representing a corresponding relationship between a description text of an entity and an embedding vector, and the second vector determination model representing a corresponding relationship between relationship information between entities and an embedding vector.

3. The method according to claim 2, wherein the determining the embedding vector of the each candidate entity based on the each candidate entity and the preset entity embedding vector determination model, comprises:
   acquiring a description text of the each candidate entity;
   determining a first embedding vector of the each candidate entity based on each description text and the first vector determination model;
   determining relationship information between candidate entities;
   determining a second embedding vector of the each entity mention, based on the relationship information between candidate entities and the second vector determination model; and
   determining the embedding vector of the each candidate entity, based on the first embedding vector and the second embedding vector.

4. The method according to claim 1, wherein the determining context semantic information of the target text based on the target text and each embedding vector, comprises:
   determining a word vector sequence of the target text; and
   determining the context semantic information, based on the word vector sequence and the each embedding vector.

5. The method according to claim 4, wherein the determining the word vector sequence of the target text, comprises:
   determining an embedding vector of a candidate entity corresponding to the entity linking result, in response to acquiring the entity linking result of the at least one entity mention; and
   updating the word vector sequence using the determined embedding vector.

6. The method according to claim 1, wherein the determining type information of the at least one entity mention, comprises:
   for each entity mention, occluding the entity mention in the target text; and
   determining the type information of the entity mention, based on the occluded target text and a pre-trained language model.

7. The method according to claim 1, wherein the determining the entity linking result of the at least one entity mention, based on each embedding vector, the context semantic information, and each type information, comprises:
   determining the candidate entity corresponding to the each entity mention, based on the each embedding vector, the context semantic information, the each type information, and a preset learning to rank model, and using the determined candidate entity as the entity linking result of the at least one entity mention.

8. The method according to claim 1, wherein the determining the entity linking result of the at least one entity mention, based on each embedding vector, the context semantic information, and each type information, comprises:
   for each entity mention, determining a similarity between the entity mention and the each candidate entity, based on the context semantic information, an embedding vector of the entity mention, the type information of the entity mention, and a vector of the each candidate entity corresponding to the entity mention; and
   determining a candidate entity having a highest similarity as the entity linking result of the entity mention.

9. The method according to claim 1, wherein the determining the entity linking result of the at least one entity mention, based on each embedding vector, the context semantic information, and each type information, comprises:
   for each entity mention, determining the entity linking result of the entity mention, based on the context semantic information and the embedding vector of the entity mention; and
   verifying the entity linking result using the type information of the entity mention.

10. An electronic device for linking an entity, comprising:
   at least one processor; and
   a memory, communicatively connected with the at least one processor;

the memory storing instructions executable by the at least one processor, the instructions, when executed by the at least one processor, causing the at least one processor to perform operations, the operations comprising:

acquiring a target text;

determining at least one entity mention comprised in the target text and a candidate entity corresponding to each entity mention;

determining an embedding vector of each candidate entity, based on the each candidate entity and a preset entity embedding vector determination model;

determining context semantic information of the target text, based on the target text and each embedding vector;

determining type information of the at least one entity mention based on a context vocabulary of each entity mention; and determining an entity linking result of the at least one entity mention, based on the each embedding vector, the context semantic information, and each type information.

11. The electronic device according to claim 10, wherein the entity embedding vector determination model comprises a first vector determination model and a second vector determination model, the first vector determination model representing a corresponding relationship between a description text of an entity and an embedding vector, and the second vector determination model representing a corresponding relationship between relationship information between entities and an embedding vector.

12. The electronic device according to claim 11, wherein the determining the embedding vector of the each candidate entity based on the each candidate entity and the preset entity embedding vector determination model, comprises:

acquiring a description text of the each candidate entity;

determining a first embedding vector of the each candidate entity based on each description text and the first vector determination model;

determining relationship information between candidate entities;

determining a second embedding vector of the each entity mention, based on the relationship information between candidate entities and the second vector determination model; and determining the embedding vector of the each candidate entity, based on the first embedding vector and the second embedding vector.

13. The electronic device according to claim 10, wherein the determining context semantic information of the target text based on the target text and each embedding vector, comprises:

determining a word vector sequence of the target text; and determining the context semantic information, based on the word vector sequence and the each embedding vector.

14. The electronic device according to claim 13, wherein the determining the word vector sequence of the target text, comprises:

determining an embedding vector of a candidate entity corresponding to the entity linking result, in response to acquiring the entity linking result of the at least one entity mention; and updating the word vector sequence using the determined embedding vector.

15. The electronic device according to claim 10, wherein the determining type information of the at least one entity mention, comprises:

for each entity mention, occluding the entity mention in the target text; and determining the type information of the entity mention, based on the occluded target text and a pre-trained language model.

16. The electronic device according to claim 10, wherein the determining the entity linking result of the at least one entity mention, based on each embedding vector, the context semantic information, and each type information, comprises:

determining the candidate entity corresponding to the each entity mention, based on the each embedding vector, the context semantic information, the each type information, and a preset learning to rank model, and using the determined candidate entity as the entity linking result of the at least one entity mention.

17. The electronic device according to claim 10, wherein the determining the entity linking result of the at least one entity mention, based on each embedding vector, the context semantic information, and each type information, comprises:

for each entity mention, determining a similarity between the entity mention and the each candidate entity, based on the context semantic information, an embedding vector of the entity mention, the type information of the entity mention, and a vector of the each candidate entity corresponding to the entity mention; and determining a candidate entity having a highest similarity as the entity linking result of the entity mention.

18. The electronic device according to claim 10, wherein the determining the entity linking result of the at least one entity mention, based on each embedding vector, the context semantic information, and each type information, comprises:

for each entity mention, determining the entity linking result of the entity mention, based on the context semantic information and the embedding vector of the entity mention; and verifying the entity linking result using the type information of the entity mention.

19. A non-transitory computer readable storage medium, storing computer instructions, the computer instructions, when executed by a computer, cause the computer to perform operations comprising:

acquiring a target text;

determining at least one entity mention comprised in the target text and a candidate entity corresponding to each entity mention;

determining an embedding vector of each candidate entity, based on the each candidate entity and a preset entity embedding vector determination model;

determining context semantic information of the target text, based on the target text and each embedding vector;

determining type information of the at least one entity mention based on a context vocabulary of each entity mention; and determining an entity linking result of the at least one entity mention, based on the each embedding vector, the context semantic information, and each type information.

* * * * *